US008821362B2

(12) United States Patent
Kidd et al.

(10) Patent No.: US 8,821,362 B2
(45) Date of Patent: Sep. 2, 2014

(54) MULTIPLE MODULAR IN-LINE ROTARY SEPARATOR BUNDLE

(75) Inventors: H. Allan Kidd, Singlehouse, PA (US); William C. Maier, Almond, NY (US)

(73) Assignee: Dresser-Rand Company, Olean, NY (US)

( * ) Notice: Subject to any disclaimer, the term of this patent is extended or adjusted under 35 U.S.C. 154(b) by 0 days.

(21) Appl. No.: 13/810,401

(22) PCT Filed: Jun. 28, 2011

(86) PCT No.: PCT/US2011/042227
§ 371 (c)(1),
(2), (4) Date: Jan. 29, 2013

(87) PCT Pub. No.: WO2012/012143
PCT Pub. Date: Jan. 26, 2012

(65) Prior Publication Data
US 2013/0210598 A1    Aug. 15, 2013

Related U.S. Application Data

(60) Provisional application No. 61/366,342, filed on Jul. 21, 2010.

(51) Int. Cl.
*B04B 5/10* (2006.01)
*B04B 1/04* (2006.01)

(52) U.S. Cl.
USPC ................ 494/33; 494/37; 210/380.3

(58) Field of Classification Search
USPC ............. 494/31, 33, 37, 43; 210/380.1, 380.3
See application file for complete search history.

(56) References Cited

U.S. PATENT DOCUMENTS

| 689,572 A | * | 12/1901 | Berrigan | ................ 210/325 |
| 815,812 A | | 3/1906 | Gow | |

(Continued)

FOREIGN PATENT DOCUMENTS

| AU | 2005282269 | 9/2005 |
| AU | 2010202069 | 6/2010 |

(Continued)

OTHER PUBLICATIONS

Bi-Phase Rotary Separator Turbine, Multiphase Power & Processing Technologies LLC Technical literature (available at http://www.mpptech.com/techppp/pdfs/Bi-Phase.pdf).

(Continued)

*Primary Examiner* — Charles Cooley
(74) *Attorney, Agent, or Firm* — Edmonds & Nolte, PC

(57) ABSTRACT

An apparatus and method for separating a mixed flow into a higher-density component and a lower-density component is provided. The apparatus may include a casing having a fluid entrance assembly, a fluid outlet assembly, and a drain. The apparatus may also include a plurality of rotary separators disposed in the casing. Each of the plurality of rotary separators may include an inlet in fluid communication with the fluid entrance assembly, a discharge in fluid communication with the fluid outlet assembly, and an outlet passage in communication with the drain. At least one of the plurality of rotary separators may include a stationary housing and a rotatable drum disposed at least partially in the stationary housing. The stationary housing may define a slot at least partially providing the outlet passage, and the rotatable drum may be configured to centrifuge the mixed flow.

19 Claims, 7 Drawing Sheets

(56) References Cited

U.S. PATENT DOCUMENTS

| | | | |
|---|---|---|---|
| 949,226 A * | 2/1910 | Goodman | 494/33 |
| 1,057,613 A | 4/1913 | Baldwin | |
| 1,061,656 A | 5/1913 | Black | |
| 1,480,775 A | 1/1924 | Marien | |
| 1,622,768 A | 3/1927 | Cook | |
| 1,642,454 A | 9/1927 | Malmstrom | |
| 1,861,878 A * | 6/1932 | Quiroz | 494/33 |
| 1,906,457 A * | 5/1933 | Flowers | 494/66 |
| 2,006,244 A | 6/1935 | Kopsa | |
| 2,300,766 A | 11/1942 | Baumann | |
| 2,328,031 A | 8/1943 | Risley | |
| 2,345,437 A | 3/1944 | Tinker | |
| 2,347,939 A | 5/1944 | Down | |
| 2,383,244 A | 8/1945 | Farmer | |
| 2,519,971 A * | 8/1950 | Le Clair | 494/56 |
| 2,720,313 A | 12/1951 | Pattison | |
| 2,602,462 A | 7/1952 | Barrett | |
| 2,743,865 A | 5/1956 | Graae | |
| 2,811,303 A | 10/1957 | Ault | |
| 2,836,117 A | 5/1958 | Lankford | |
| 2,868,565 A | 1/1959 | Suderow | |
| 2,897,917 A | 8/1959 | Hunter | |
| 2,932,360 A | 4/1960 | Hungate | |
| 2,954,841 A | 10/1960 | Reistle | |
| 2,955,673 A | 10/1960 | Kennedy | |
| 3,044,657 A | 7/1962 | Horton | |
| 3,395,511 A | 9/1964 | Ernst | |
| 3,175,572 A | 3/1965 | Kauer, Jr. | |
| 3,191,364 A | 6/1965 | Sylvan | |
| 3,198,214 A | 8/1965 | Lorenz | |
| 3,204,696 A | 9/1965 | De Priester | |
| 3,213,794 A | 10/1965 | Adams | |
| 3,220,245 A | 11/1965 | Van Winkle | |
| 3,273,325 A | 9/1966 | Gerhold | |
| 3,341,111 A | 9/1967 | Sanders | |
| 3,352,577 A | 11/1967 | Medney | |
| 3,402,434 A | 1/1969 | Swearingen | |
| 3,454,163 A | 8/1969 | Read | |
| 3,487,432 A | 12/1969 | Jenson | |
| 3,490,209 A | 1/1970 | Fernandes | |
| 3,500,614 A | 3/1970 | Soo | |
| 3,548,568 A | 12/1970 | Carlson, Jr. | |
| 3,578,342 A | 5/1971 | Satterthwaite et al. | |
| 3,628,812 A | 12/1971 | Larraide et al. | |
| 3,672,733 A | 1/1972 | Arsenius | |
| 3,646,727 A | 3/1972 | Wachsmuth | |
| 3,694,103 A | 9/1972 | Cohen | |
| 3,810,347 A | 5/1974 | Kartinen | |
| 3,814,486 A | 6/1974 | Schurger | |
| 3,829,179 A | 8/1974 | Kurita | |
| 3,915,673 A | 10/1975 | Tamai | |
| 3,973,930 A | 8/1976 | Burgess | |
| 3,975,123 A | 8/1976 | Schibbye | |
| 4,033,647 A | 7/1977 | Beavers | |
| 4,043,353 A | 8/1977 | Shirey | |
| 4,059,364 A | 11/1977 | Andersen | |
| 4,078,809 A | 3/1978 | Garrick | |
| 4,087,261 A | 5/1978 | Hays | |
| 4,103,899 A | 8/1978 | Turner | |
| 4,112,687 A | 9/1978 | Dixon | |
| 4,117,359 A | 9/1978 | Wehde | |
| 4,135,542 A | 1/1979 | Chisholm | |
| 4,141,283 A | 2/1979 | Swanson | |
| 4,146,261 A | 3/1979 | Edmaier | |
| 4,165,622 A | 8/1979 | Brown, Jr. | |
| 4,174,925 A | 11/1979 | Pfenning | |
| 4,182,480 A | 1/1980 | Theyse | |
| 4,197,990 A | 4/1980 | Carberg | |
| 4,205,927 A | 6/1980 | Simmons | |
| 4,227,373 A | 10/1980 | Amend | |
| 4,258,551 A | 3/1981 | Ritzi | |
| 4,259,045 A | 3/1981 | Teruyama | |
| 4,278,200 A | 7/1981 | Gunnewig | |
| 4,298,311 A | 11/1981 | Ritzi | |
| 4,303,372 A | 12/1981 | Caffrey | |
| 4,333,748 A | 6/1982 | Erickson | |
| 4,334,592 A | 6/1982 | Fair | |
| 4,336,693 A | 6/1982 | Hays | |
| 4,339,923 A | 7/1982 | Hays | |
| 4,347,900 A | 9/1982 | Barrington | |
| 4,363,608 A | 12/1982 | Mulders | |
| 4,374,583 A | 2/1983 | Barrington | |
| 4,375,975 A | 3/1983 | McNicholas | |
| 4,382,804 A | 5/1983 | Mellor | |
| 4,384,724 A | 5/1983 | Derman | |
| 4,391,102 A | 7/1983 | Studhalter | |
| 4,396,361 A | 8/1983 | Fraser | |
| 4,432,470 A | 2/1984 | Sopha | |
| 4,438,638 A | 3/1984 | Hays | |
| 4,441,322 A | 4/1984 | Ritzi | |
| 4,442,925 A | 4/1984 | Fukushima | |
| 4,453,893 A | 6/1984 | Hutmaker | |
| 4,453,894 A | 6/1984 | Ferone | |
| 4,463,567 A | 8/1984 | Amend | |
| 4,468,234 A | 8/1984 | McNicholas | |
| 4,471,795 A | 9/1984 | Linhardt | |
| 4,477,223 A | 10/1984 | Giroux | |
| 4,502,839 A | 3/1985 | Maddox | |
| 4,511,309 A | 4/1985 | Maddox | |
| 4,531,888 A | 7/1985 | Buchelt | |
| 4,536,134 A | 8/1985 | Huiber | |
| 4,541,531 A | 9/1985 | Brule | |
| 4,541,607 A | 9/1985 | Hotger | |
| 4,573,527 A | 3/1986 | McDonough | |
| 4,574,815 A | 3/1986 | West | |
| 4,648,806 A | 3/1987 | Alexander | |
| 4,650,578 A | 3/1987 | Cerdan | |
| 4,687,017 A | 8/1987 | Danko | |
| 4,721,561 A | 1/1988 | Oetiker | |
| 4,737,081 A | 4/1988 | Nakajima | |
| 4,752,185 A | 6/1988 | Bulter | |
| 4,807,664 A | 2/1989 | Wilson | |
| 4,813,495 A | 3/1989 | Leach | |
| 4,821,737 A | 4/1989 | Nelson | |
| 4,826,403 A | 5/1989 | Catlow | |
| 4,830,331 A | 5/1989 | Vindum | |
| 4,832,709 A | 5/1989 | Nagyszalanczy | |
| 4,904,284 A | 2/1990 | Hanabusa | |
| 4,984,830 A | 1/1991 | Saunders | |
| 5,007,328 A | 4/1991 | Otterman | |
| 5,024,585 A | 6/1991 | Kralovec | |
| 5,043,617 A | 8/1991 | Rostron | |
| 5,044,701 A | 9/1991 | Watanabe | |
| 5,045,046 A | 9/1991 | Bond | |
| 5,054,995 A | 10/1991 | Kaseley | |
| 5,064,452 A | 11/1991 | Yano | |
| 5,080,137 A | 1/1992 | Adams | |
| 5,163,895 A | 11/1992 | Titus | |
| 5,190,440 A | 3/1993 | Maier | |
| 5,202,024 A | 4/1993 | Andersson | |
| 5,202,026 A | 4/1993 | Lema | |
| 5,203,891 A | 4/1993 | Lema | |
| 5,207,810 A | 5/1993 | Sheth | |
| 5,211,427 A | 5/1993 | Washizu | |
| 5,244,479 A | 9/1993 | Dean, II | |
| 5,246,346 A | 9/1993 | Schiesser | |
| 5,280,766 A | 1/1994 | Mohn | |
| 5,285,123 A | 2/1994 | Kataoka | |
| 5,306,051 A | 4/1994 | Loker | |
| 5,337,779 A | 8/1994 | Fukuhara | |
| 5,378,121 A | 1/1995 | Hackett | |
| 5,382,141 A | 1/1995 | Stinessen | |
| 5,385,446 A | 1/1995 | Hays | |
| 5,412,977 A | 5/1995 | Schmohl | |
| 5,421,708 A | 6/1995 | Utter | |
| 5,443,581 A | 8/1995 | Malone | |
| 5,464,536 A | 11/1995 | Rogers | |
| 5,484,521 A | 1/1996 | Kramer | |
| 5,496,394 A | 3/1996 | Nied | |
| 5,500,039 A | 3/1996 | Mori | |
| 5,525,034 A | 6/1996 | Hays | |
| 5,525,146 A | 6/1996 | Straub | |
| 5,531,811 A | 7/1996 | Kloberdanz | |
| 5,538,259 A | 7/1996 | Uhmer | |

(56) References Cited

U.S. PATENT DOCUMENTS

| | | |
|---|---|---|
| 5,542,831 A | 8/1996 | Scarfone |
| 5,575,309 A | 11/1996 | Connell |
| 5,575,615 A | 11/1996 | Mohn |
| 3,431,747 A | 12/1996 | Hasheimi |
| 5,585,000 A | 12/1996 | Sassi |
| 5,605,172 A | 2/1997 | Schubert |
| 5,622,621 A | 4/1997 | Kramer |
| 5,628,623 A | 5/1997 | Skaggs |
| 5,634,492 A | 6/1997 | Steinruck |
| 5,640,472 A | 6/1997 | Meinzer |
| 5,641,280 A | 6/1997 | Timuska |
| 5,653,347 A | 8/1997 | Larsson |
| 5,664,420 A | 9/1997 | Hays |
| 5,682,759 A | 11/1997 | Hays |
| 5,683,235 A | 11/1997 | Welch |
| 5,685,691 A | 11/1997 | Hays |
| 5,687,249 A | 11/1997 | Kato |
| 5,693,125 A | 12/1997 | Dean |
| 5,703,424 A | 12/1997 | Dorman |
| 5,709,528 A | 1/1998 | Hablanian |
| 5,713,720 A | 2/1998 | Barhoum |
| 5,720,799 A | 2/1998 | Hays |
| 5,749,391 A | 5/1998 | Loutzenhiser |
| 5,750,040 A | 5/1998 | Hays |
| 5,775,882 A | 7/1998 | Kiyokawa |
| 5,779,619 A | 7/1998 | Borgstrom |
| 5,795,135 A | 8/1998 | Nyilas |
| 5,800,092 A | 9/1998 | Nill |
| 5,848,616 A | 12/1998 | Vogel |
| 5,850,857 A | 12/1998 | Simpson |
| 5,853,585 A | 12/1998 | Nesseth |
| 5,861,052 A | 1/1999 | Meinander |
| 5,863,023 A | 1/1999 | Evans |
| 5,899,435 A | 5/1999 | Mitsch |
| 5,935,053 A | 8/1999 | Strid |
| 5,938,803 A | 8/1999 | Dries |
| 5,938,819 A | 8/1999 | Seery |
| 5,946,915 A | 9/1999 | Hays |
| 5,951,066 A | 9/1999 | Lane |
| 5,965,022 A | 10/1999 | Gould |
| 5,967,746 A | 10/1999 | Hagi |
| 5,971,702 A | 10/1999 | Afton |
| 5,971,907 A | 10/1999 | Johannemann |
| 5,980,218 A | 11/1999 | Takahashi |
| 5,988,524 A | 11/1999 | Odajima |
| 6,027,311 A | 2/2000 | Hill |
| 6,035,934 A | 3/2000 | Stevenson |
| 6,059,539 A | 5/2000 | Nyilas |
| 6,068,447 A | 5/2000 | Foege |
| 6,090,174 A | 7/2000 | Douma |
| 6,090,299 A | 7/2000 | Hays |
| 6,113,675 A | 9/2000 | Branstetter |
| 6,122,915 A | 9/2000 | Hays |
| 6,123,363 A | 9/2000 | Burgard |
| 6,145,844 A | 11/2000 | Waggott |
| 6,149,825 A | 11/2000 | Gargas |
| 6,151,881 A | 11/2000 | Ai |
| 6,187,208 B1 | 2/2001 | White |
| 6,196,962 B1 | 3/2001 | Purvey |
| 6,206,202 B1 | 3/2001 | Galk |
| 6,214,075 B1 | 4/2001 | Filges |
| 6,217,637 B1 | 4/2001 | Toney |
| 6,227,379 B1 | 5/2001 | Nesseth |
| 6,277,278 B1 | 8/2001 | Conrad |
| 6,312,021 B1 | 11/2001 | Thomas |
| 6,314,738 B1 | 11/2001 | Hays |
| 6,372,006 B1 | 4/2002 | Pregenzer |
| 6,375,437 B1 | 4/2002 | Nolan |
| 6,383,262 B1 | 5/2002 | Marthinsen |
| 6,394,764 B1 | 5/2002 | Samurin |
| 6,398,973 B1 | 6/2002 | Saunders |
| 6,402,465 B1 | 6/2002 | Maier |
| 6,426,010 B1 | 7/2002 | Lecoffre |
| 6,464,469 B1 | 10/2002 | Grob |
| 6,467,988 B1 | 10/2002 | Czachor |
| 6,468,426 B1 | 10/2002 | Klass |
| 6,485,536 B1 | 11/2002 | Masters |
| 6,530,484 B1 | 3/2003 | Bosman |
| 6,530,979 B2 | 3/2003 | Firey |
| 6,531,066 B1 | 3/2003 | Saunders |
| 6,537,035 B2 | 3/2003 | Shumway |
| 6,540,917 B1 | 4/2003 | Rachels et al. |
| 6,547,037 B2 | 4/2003 | Kuzdzal |
| 6,592,654 B2 | 7/2003 | Brown |
| 6,596,046 B2 | 7/2003 | Conrad |
| 6,599,086 B2 | 7/2003 | Soja |
| 6,607,348 B2 | 8/2003 | Jean |
| 6,616,719 B1 | 9/2003 | Sun |
| 6,617,731 B1 | 9/2003 | Goodnick |
| 6,629,825 B2 | 10/2003 | Stickland |
| 6,631,617 B1 | 10/2003 | Dreiman |
| 6,658,986 B2 | 12/2003 | Pitla |
| 6,659,143 B1 | 12/2003 | Taylor |
| 6,669,845 B2 | 12/2003 | Klass |
| 6,688,802 B2 | 2/2004 | Ross |
| 6,707,200 B2 | 3/2004 | Carroll |
| 6,718,955 B1 | 4/2004 | Knight |
| 6,719,830 B2 | 4/2004 | Illingworth |
| 6,764,284 B2 | 7/2004 | Oehman |
| 6,776,812 B2 | 8/2004 | Komura |
| 6,802,693 B2 | 10/2004 | Reinfeld |
| 6,802,881 B2 | 10/2004 | Illingworth |
| 6,811,713 B2 | 11/2004 | Arnaud |
| 6,817,846 B2 | 11/2004 | Bennitt |
| 6,827,974 B2 | 12/2004 | Nelson |
| 6,837,913 B2 | 1/2005 | Schilling |
| 6,843,836 B2 | 1/2005 | Kitchener |
| 6,878,187 B1 | 4/2005 | Hays |
| 6,893,208 B2 | 5/2005 | Frosini |
| 6,907,933 B2 | 6/2005 | Choi |
| 6,979,358 B2 | 12/2005 | Ekker |
| 7,000,893 B2 | 2/2006 | Yakushi |
| 7,001,448 B1 | 2/2006 | West |
| 7,013,978 B2 | 3/2006 | Appleford |
| 7,022,150 B2 | 4/2006 | Borgstrom |
| 7,022,153 B2 | 4/2006 | McKenzie |
| 7,025,890 B2 | 4/2006 | Moya |
| 7,033,410 B2 | 4/2006 | Hilpert |
| 7,033,411 B2 | 4/2006 | Carlsson |
| 7,056,363 B2 | 6/2006 | Carlsson |
| 7,063,465 B1 | 6/2006 | Wilkes |
| 7,112,036 B2 | 9/2006 | Lubell |
| 7,131,292 B2 | 11/2006 | Ikegami |
| 7,144,226 B2 | 12/2006 | Pugnet |
| 7,159,723 B2 | 1/2007 | Hilpert |
| 7,160,518 B2 | 1/2007 | Chen |
| 7,169,305 B2 | 1/2007 | Gomez |
| 7,185,447 B2 | 3/2007 | Arbeiter |
| 7,204,241 B2 | 4/2007 | Thompson |
| 7,241,392 B2 | 7/2007 | Maier |
| 7,244,111 B2 | 7/2007 | Suter |
| 7,258,713 B2 | 8/2007 | Eubank |
| 7,270,145 B2 | 9/2007 | Koezler |
| 7,288,139 B1 | 10/2007 | Showalter |
| 7,288,202 B2 | 10/2007 | Maier |
| 7,314,560 B2 | 1/2008 | Yoshida |
| 7,323,023 B2 | 1/2008 | Yolker |
| 7,328,749 B2 | 2/2008 | Reitz |
| 7,335,313 B2 | 2/2008 | Moya |
| 7,377,110 B2 | 5/2008 | Sheridan |
| 7,381,235 B2 | 6/2008 | Koene |
| 7,396,373 B2 | 7/2008 | Lagerstedt |
| 7,399,412 B2 | 7/2008 | Keuschnigg |
| 7,435,290 B2 | 10/2008 | Lane |
| 7,445,653 B2 | 11/2008 | Trautmann |
| 7,470,299 B2 | 12/2008 | Han |
| 7,473,083 B2 | 1/2009 | Oh |
| 7,479,171 B2 | 1/2009 | Cho |
| 7,494,523 B2 | 2/2009 | Oh |
| 7,501,002 B2 | 3/2009 | Han |
| 7,520,210 B2 | 4/2009 | Theodore, Jr. |
| 7,575,422 B2 | 8/2009 | Bode |
| 7,578,863 B2 | 8/2009 | Becker |
| 7,591,882 B2 | 9/2009 | Harazim |

(56) References Cited

U.S. PATENT DOCUMENTS

| | | | |
|---|---|---|---|
| 7,594,941 B2 | 9/2009 | Zheng | |
| 7,594,942 B2 | 9/2009 | Polderman | |
| 7,610,955 B2 | 11/2009 | Irwin | |
| 7,628,836 B2 | 12/2009 | Barone et al. | |
| 7,637,699 B2 | 12/2009 | Albrecht | |
| 7,674,377 B2 | 3/2010 | Carew | |
| 7,677,308 B2 | 3/2010 | Kolle | |
| 7,708,537 B2 | 5/2010 | Bhatia | |
| 7,708,808 B1 | 5/2010 | Heumann | |
| 7,744,663 B2 | 6/2010 | Wallace | |
| 7,748,079 B2 | 7/2010 | McDowell | |
| 7,766,989 B2 | 8/2010 | Lane | |
| 7,811,344 B1 | 10/2010 | Duke | |
| 7,811,347 B2 | 10/2010 | Carlsson | |
| 7,815,415 B2 | 10/2010 | Kanezawa | |
| 7,824,458 B2 | 11/2010 | Borgstrom | |
| 7,824,459 B2 | 11/2010 | Borgstrom | |
| 7,846,228 B1 | 12/2010 | Saaaki | |
| 7,938,874 B2 | 5/2011 | Auber | |
| 8,062,400 B2 * | 11/2011 | Maier | 55/400 |
| 8,231,336 B2 * | 7/2012 | Maier et al. | 415/121.2 |
| 8,302,779 B2 * | 11/2012 | Maier | 210/380.3 |
| 8,439,998 B2 * | 5/2013 | Ito et al. | |
| 8,663,483 B2 * | 3/2014 | Lardy et al. | 494/43 |
| 8,673,159 B2 * | 3/2014 | Kumar et al. | 494/43 |
| 2001/0007283 A1 | 7/2001 | Johal | |
| 2002/0009361 A1 | 1/2002 | Reichert | |
| 2003/0029318 A1 | 2/2003 | Firey | |
| 2003/0035718 A1 | 2/2003 | Langston | |
| 2003/0136094 A1 | 7/2003 | Illingworth | |
| 2003/0192718 A1 | 10/2003 | Buckman | |
| 2004/0007261 A1 | 1/2004 | Cornwell | |
| 2004/0170505 A1 | 9/2004 | Lenderink | |
| 2005/0173337 A1 | 8/2005 | Costinel | |
| 2005/0241178 A1 | 11/2005 | Arbeiter | |
| 2006/0065609 A1 | 3/2006 | Arthur | |
| 2006/0090430 A1 | 5/2006 | Trautman | |
| 2006/0096933 A1 | 5/2006 | Maier | |
| 2006/0157251 A1 | 7/2006 | Stinessen | |
| 2006/0157406 A1 | 7/2006 | Maier | |
| 2006/0193728 A1 | 8/2006 | Lindsey | |
| 2006/0222515 A1 | 10/2006 | Delmotte | |
| 2006/0230933 A1 | 10/2006 | Harazim | |
| 2006/0239831 A1 | 10/2006 | Garris, Jr. | |
| 2006/0254659 A1 | 11/2006 | Bellott | |
| 2006/0275160 A1 | 12/2006 | Leu | |
| 2007/0029091 A1 | 2/2007 | Stinessen | |
| 2007/0036646 A1 | 2/2007 | Nguyen | |
| 2007/0051245 A1 | 3/2007 | Yun | |
| 2007/0062374 A1 | 3/2007 | Kolle | |
| 2007/0065317 A1 | 3/2007 | Stock | |
| 2007/0084340 A1 | 4/2007 | Dou | |
| 2007/0140815 A1 | 6/2007 | Shinozaki | |
| 2007/0140870 A1 | 6/2007 | Fukanuma | |
| 2007/0151922 A1 | 7/2007 | Mian | |
| 2007/0163215 A1 | 7/2007 | Lagerstadt | |
| 2007/0172363 A1 | 7/2007 | Laboube | |
| 2007/0196215 A1 | 8/2007 | Frosini | |
| 2007/0227969 A1 | 10/2007 | Dehaene | |
| 2007/0256398 A1 | 11/2007 | Barone et al. | |
| 2007/0294986 A1 | 12/2007 | Beetz | |
| 2008/0031732 A1 | 2/2008 | Peer | |
| 2008/0039732 A9 | 2/2008 | Bowman | |
| 2008/0179261 A1 | 7/2008 | Patrovsky | |
| 2008/0246281 A1 | 10/2008 | Agrawal | |
| 2008/0315812 A1 | 12/2008 | Balboul | |
| 2009/0013658 A1 | 1/2009 | Borgstrom | |
| 2009/0015012 A1 | 1/2009 | Metzler | |
| 2009/0025562 A1 | 1/2009 | Hallgren | |
| 2009/0025563 A1 | 1/2009 | Borgstrom | |
| 2009/0151928 A1 | 6/2009 | Lawson | |
| 2009/0169407 A1 | 7/2009 | Yun | |
| 2009/0173095 A1 | 7/2009 | Bhatia | |
| 2009/0266231 A1 | 10/2009 | Franzen | |
| 2009/0304496 A1 | 12/2009 | Maier | |
| 2009/0321343 A1 | 12/2009 | Maier | |
| 2009/0324391 A1 | 12/2009 | Maier | |
| 2010/0007133 A1 | 1/2010 | Maier | |
| 2010/0021292 A1 * | 1/2010 | Maier et al. | 415/208.1 |
| 2010/0038309 A1 * | 2/2010 | Maier | 210/512.3 |
| 2010/0043288 A1 | 2/2010 | Wallace | |
| 2010/0043364 A1 | 2/2010 | Curien | |
| 2010/0044966 A1 | 2/2010 | Majot | |
| 2010/0072121 A1 | 3/2010 | Maier | |
| 2010/0074768 A1 | 3/2010 | Maier | |
| 2010/0083690 A1 | 4/2010 | Sato | |
| 2010/0090087 A1 | 4/2010 | Maier | |
| 2010/0139776 A1 | 6/2010 | Auber | |
| 2010/0143172 A1 | 6/2010 | Sato | |
| 2010/0163232 A1 | 7/2010 | Kolle | |
| 2010/0183438 A1 | 7/2010 | Maier | |
| 2010/0239419 A1 | 9/2010 | Maier | |
| 2010/0239437 A1 | 9/2010 | Maier | |
| 2010/0247299 A1 | 9/2010 | Maier | |
| 2010/0257827 A1 | 10/2010 | Lane | |
| 2011/0017307 A1 | 1/2011 | Kidd | |
| 2011/0061536 A1 * | 3/2011 | Maier et al. | 95/271 |
| 2013/0210598 A1 * | 8/2013 | Kidd et al. | 494/31 |
| 2013/0327725 A1 * | 12/2013 | Kumar et al. | |
| 2013/0333566 A1 * | 12/2013 | Lardy et al. | |

FOREIGN PATENT DOCUMENTS

| | | |
|---|---|---|
| CA | 2578262 | 9/2005 |
| CA | 2647511 | 10/2007 |
| DE | 1024439 B | 2/1958 |
| EP | 0150599 | 8/1985 |
| EP | 301285 | 10/1991 |
| EP | 561065 | 11/1991 |
| EP | 552837 | 1/1993 |
| EP | 882511 A2 * | 12/1998 |
| EP | 1582703 | 10/2005 |
| EP | 2013479 | 1/2009 |
| EP | 2063975 | 6/2009 |
| EP | 2233745 | 9/2010 |
| EP | 2322282 | 5/2011 |
| EP | 1796808 | 7/2011 |
| GB | 417373 | 10/1934 |
| GB | 1192354 | 5/1970 |
| GB | 1512381 | 6/1978 |
| GB | 2323639 | 9/1998 |
| GB | 2337561 | 11/1999 |
| GB | 2477699 | 8/2011 |
| JP | 54099206 | 1/1978 |
| JP | 80 68501 | 3/1996 |
| JP | 8-284961 A | 11/1996 |
| JP | 2002 242699 | 8/2002 |
| JP | 3711028 | 10/2005 |
| JP | 2005291202 | 10/2005 |
| KR | 2009085521 | 2/2008 |
| MX | 2008012579 | 12/2008 |
| SU | 644544 A * | 1/1979 |
| WO | WO9524563 | 9/1995 |
| WO | WO9619276 | 6/1996 |
| WO | WO0074811 | 12/2000 |
| WO | WO0117096 | 3/2001 |
| WO | WO2005003512 | 1/2005 |
| WO | WO2006029413 | 3/2006 |
| WO | WO2006053088 | 5/2006 |
| WO | WO2007043889 | 4/2007 |
| WO | WO2007103248 | 9/2007 |
| WO | WO2007120506 | 10/2007 |
| WO | WO2008036221 | 3/2008 |
| WO | WO2008039446 | 3/2008 |
| WO | WO2008039491 | 4/2008 |
| WO | WO2008039731 | 4/2008 |
| WO | WO2008039732 | 4/2008 |
| WO | WO2008039733 | 4/2008 |
| WO | WO2008039734 | 4/2008 |
| WO | WO2008036394 | 7/2008 |
| WO | WO2009111616 | 9/2009 |
| WO | WO2009158252 | 12/2009 |
| WO | WO2009158253 | 12/2009 |
| WO | WO2010065303 | 6/2010 |

(56) References Cited

FOREIGN PATENT DOCUMENTS

| WO | WO2010083416 | 7/2010 |
| WO | WO2010083427 | 7/2010 |
| WO | WO2010107579 | 9/2010 |
| WO | WO2010110992 | 9/2010 |
| WO | WO2011034764 | 3/2011 |
| WO | WO2011100158 | 8/2011 |
| WO | WO2012009158 | 1/2012 |
| WO | WO2012009159 | 1/2012 |
| WO | WO2012012143 | 1/2012 |
| WO | WO2012033632 | 3/2012 |

OTHER PUBLICATIONS

Tri-Phase Rotary Separator Turbine, Multiphase Power & Processing Technologies LLC Technical Literature (available at http://www/mpptech.com/techpp/pdfs/Tri-Phase.pdf).

IRIS™ In-Line Rotary Separator/Scrubber, Multiphase Power & Processing Technologies LLC Technical Literature (available at http://www.mpptech.com/products/IRIS_Rev5.2PDF).

Testing of an In-Line Rotary Separator (IRIS™) at the Chevron F. Ramirez Gas Production Facility by Hank Rawlins and Frank Ting, Presented at 52nd Annual Laurence Reid Gas Conditioning Conference, The University of Oklahoma, Feb. 24-27, 2002.

Utilization of Inline Rotary Separator as a Wet Gas Meter by V.C. Ting Presented at the 19th North Sea Flow Measurement Workshop 2001.

Analysis of Results of a Rotary Separator Rubine on the Shell Ram-Powell TLP by Greg Ross, Keith Oxley and Hank Rowlins.

Field Test Results of a Rotary Separator Turbine on the Ram/Powell TLP by C.H. Rawlins and G.D. Ross, presented at the 2001 Offshore Technology Conference in Houston, Texas Apr. 30-May 3, 2001.

Two-Phase Flow Turbines in Oil and Gas Production and Processing by Geirmund Vislie and Simon RH Davies.

Further Developments of the Biphase Rotary Separator Turbine by Geirmund Vislie, Simon Davies and Lance Hays.

"Technical Manual—High Pessure Air Compressor Model 13NL45", NAVSEA S6220-AT-MMA-010/93236, Oct. 28, 1991, pp. 3-23 to 3-32, Electric Boat Corporation, Groton, CT 06340.

EP05796401—Supplementary European Search Report mailed Aug. 26, 2008.

EP10196474—European Search Report mailed Mar. 21, 2011.

PCT/GB95/00193 Notification of International Search Report mailed Jun. 2, 1995.

PCT/FI00/00496—International Search Report mailed Oct. 16, 2000.

PCT/US2005/032556—Notification of International Search Report and Written Opinion mailed Oct. 18, 2006.

PCT/US2005/040664—Notification of International Search Report and Written Opinion mailed Oct. 17, 2006.

PCT/NO2006/000341—International Search Report mailed Jan. 11, 2007.

PCT/US2007/008149—International Preliminary Report on Patentability dated Sep. 30, 2008.

PCT/US2007/008149—Written Opinion dated Jul. 17, 2008.

PCT/US2007/020101—International Preliminary Report on Patentability dated Apr. 2, 2009.

PCT/US2007/020101—International Search Report dated Apr. 29, 2008.

PCT/US2007/020471—International Preliminary Report on Patentability dated Apr. 2, 2009.

PCT/US2007/020471—International Search Report and Written Opinion dated Apr. 1, 2008.

PCT/US2007/020659—International Preliminary Report on Patentability dated Mar. 31, 2009.

PCT/US2007/020659—International Search Report and Written Opinion dated Sep. 17, 2008.

PCT/US2007/020768—International Preliminary Report on Patentability dated Apr. 9, 2009.

PCT/US2007/020768—International Search Report and Written Opinion dated Mar. 3, 2008.

PCT/US2007/079348—International Preliminary Report on Patentability dated Apr. 9, 2009.

PCT/US2007/079348—International Search Report dated Apr. 11, 2008.

PCT/US2007/079348—Written Opinion mailed Apr. 11, 2008.

PCT/US2007/079349—International Preliminary Report on Patentability dated Mar. 31, 2009.

PCT/US2007/079349—International Search Report and Written Opinion dated Apr. 2, 2008.

PCT/US2007/079350—International Preliminary Report on Patentability mailed Apr. 9, 2009.

PCT/US2007/079350—International Search Report mailed Apr. 2, 2008.

PCT/US2007/079350—Written Opinion mailed Apr. 2, 2008.

PCT/US2007/079352—International Preliminary Report on Patentability dated Apr. 9, 2009.

PCT/US2007/079352—International Search Report and Written Opinion dated Aug. 27, 2008.

PCT/US2009/036142—International Preliminary Report on Patentability dated Sep. 16, 2010.

PCT/US2009/036142—International Search Report mailed May 11, 2009.

PCT/US2009/036142—Written Opinion dated May 11, 2009.

PCT/US2009/047662—International Preliminary Report on Patentability dated Jan. 13, 2011.

PCT/US2009/047662—Written Opinion dated Aug. 20, 2009.

PCT/U52009/064916—Notification of International Preliminary Report on Patentability mailed Jun. 16, 2011.

PCT/US2009/064916—Notification of International Search Report and Written Opinion mailed Jan. 25, 2010.

PCT/US2010/021199—International Preliminary Report on Patentability dated Mar. 29, 2011.

PCT/US2010/021199—International Search Report and Written Opinion dated Mar. 22, 2010.

PCT/US2010/021218—International Report on Patentability dated Feb. 2, 2011.

PCT/US2010/021218—International Search Report and Written Opinion dated Mar. 23, 2010.

PCT/US2010/025650—International Search Report and Written Opinion dated Apr. 22, 2010.

PCT/US2010/025952—International Report on Patentability dated Mar. 14, 2011.

PCT/US2010/025952—International Search Report and Written Opinion dated Apr. 12, 2010.

PCT/US2011/023593—Notification of International Search Report and Written Opinion dated Oct. 18, 2011.

PCT/US2011/037112—Notification of International Search Report and Written Opinion mailed Jan. 13, 2012.

PCT/US2011/042205—Notification of International Search Report and Written Opinion mailed Feb. 21, 2012.

PCT/US2011/042209—International Search Report mailed Feb. 24, 2012.

PCT/US2011/042227—Notification of International Search Report dated Feb. 21, 2012.

PCT/US2011/048652—Notification of International Search Report and Written Opinion mailed Jan. 9, 2012.

* cited by examiner

MULTIPLE MODULAR IN-LINE ROTARY SEPARATOR BUNDLE

CROSS-REFERENCE TO RELATED APPLICATIONS

The present application is a national stage application of PCT Pat. App. No. PCT/US2011/042227, filed Jun. 28, 2011, which claims priority to U.S. Provisional Patent Application having Ser. No. 61/366,342, filed Jul. 21, 2010. These priority applications are incorporated herein in their entirety, to the extent consistent with the present application.

BACKGROUND

Separators for separating components of a fluid flow based on density are used in various industrial applications. One type of separator is known as a rotary separator because it includes a rotating element, often referred to as a "drum," that centrifuges higher-density elements of the fluid, such as liquid, from lower-density elements, such as gas. Rotary separators can be positioned "in-line," meaning they are coupled on both the inlet and outlet ends to a hydrocarbon or other type of pipeline. Rotary separators, including in-line rotary separators, can also be attached to various other components, for example, compressors, other separators, and scrubbers. Further, rotary separators, including in-line rotary separators, can be driven to rotate by suitable drivers or can be "self-driven," converting some of the potential energy stored in the pressure of the fluid flow into rotational kinetic energy.

Scalability can present difficulties in some rotary separator applications. Typically, a given size rotary separator has design limits relating to flow rate, separation efficiency, and the like. If, for example, a certain application calls for flow rates which are above the design limits of a given rotary separator, a larger rotary separator has to be designed and implemented to satisfy the requirements. Alternatively, multiple smaller rotary separators can be used, but this, in turn, multiplies the space taken up by separation unit. Further, distribution of fluid to multiple separators, while maintaining efficiency in all separators presents challenges.

Therefore, there is a need for a rotary separator that is modular in design such that greater flow rates and separation efficiencies can be achieved.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

SUMMARY

Figure 1:
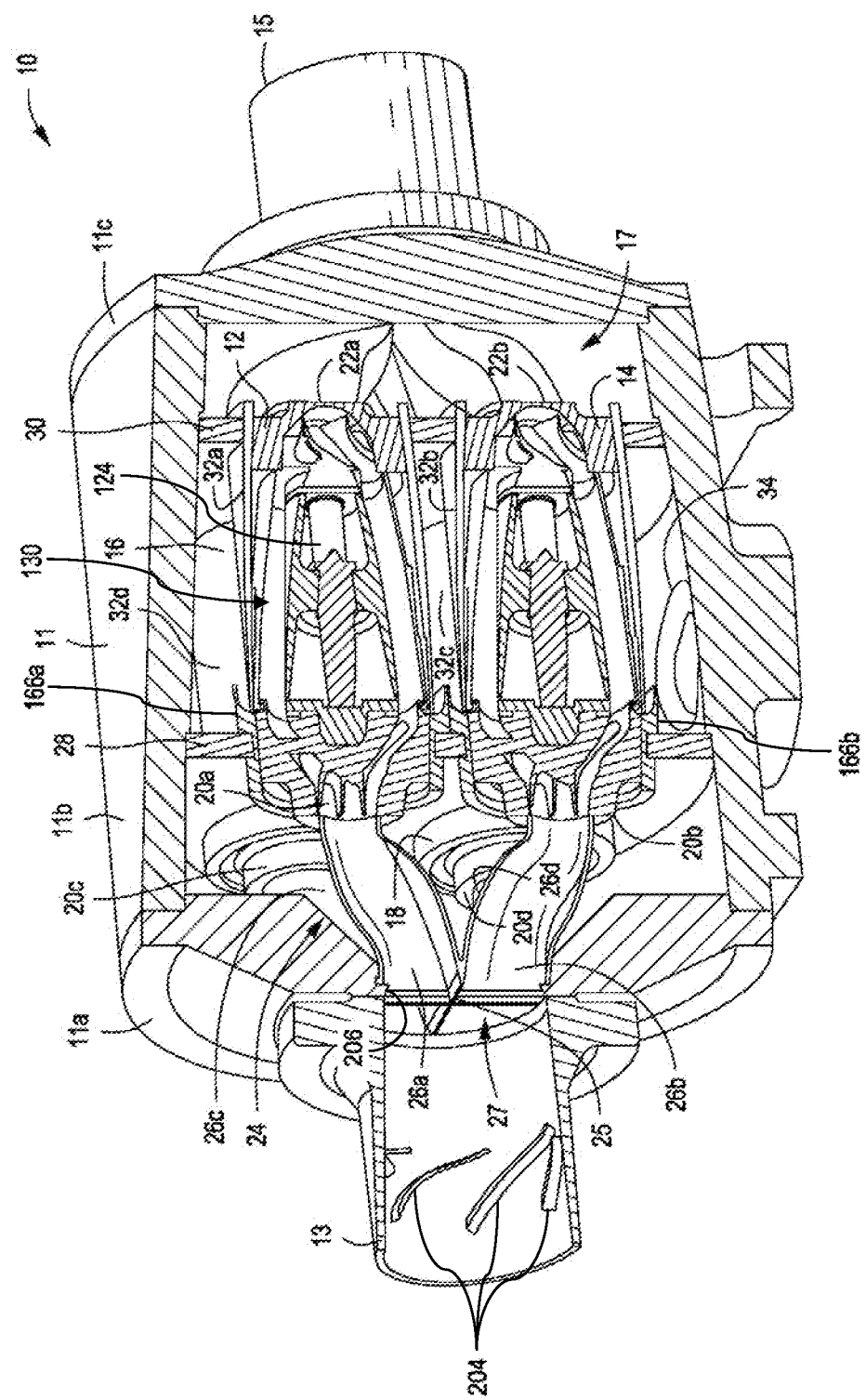
FIG. 1 illustrates a cut-away perspective view of an exemplary modular separator assembly including a pressurized casing, a plurality of rotary separators disposed therein, a fluid entrance assembly, and a fluid outlet assembly, in accordance with one or more aspects of the disclosure.

Embodiments of the disclosure may also provide an exemplary apparatus for separating a flow into a higher-density component and a lower-density. The apparatus may include a casing having a fluid entrance assembly, a fluid outlet assembly, and a drain. The apparatus may also include a plurality of rotary separators disposed in the casing, each having an inlet fluidly coupled with the inlet of the fluid entrance assembly, a discharge in communication with the fluid outlet assembly, and an outlet passage in communication with the drain.

Embodiments of the disclosure may provide an exemplary modular fluid separator assembly. The assembly may include a pressurized casing having a fluid outlet assembly, a drain, and a fluid entrance assembly including a flow divider defining sections, distribution vanes disposed upstream the flow divider, and a ramp disposed upstream the flow divider, with the distribution vanes and ramp being configured to distribute a mixed fluid flow. The assembly may also include a plurality of flow guides fluidly coupled to the flow divider, with each of the plurality of flow guides being configured to receive the mixed fluid flow from one of the sections of the flow divider. The assembly may also include a plurality of rotary separators disposed in parallel in the pressurized casing, with each of the plurality of rotary separators having a discharge and an inlet fluidly coupled to one of the plurality of flow guides, and defining an outlet passage in fluid communication with the drain. Further, each of the plurality of rotary separators is configured to separate the mixed flow and to expel a higher-density component thereof to the drain. The assembly may also include an outlet manifold extending from and fluidly coupling the discharge of each of the plurality of rotary separators to the outlet assembly.

Embodiments of the disclosure may further provide an exemplary method for separating a higher density component of a mixed flow from a lower density component of the mixed flow. The method may include receiving the mixed flow through a fluid entrance assembly of a casing, dividing the mixed flow, and introducing the divided mixed flow to a plurality of flow guides. The method may further include receiving the mixed flow from the plurality of flow guides with a plurality of rotary separators disposed in parallel in the pressurized casing, and centrifuging the mixed flow in the plurality of rotary separators to separate the higher-density component of the mixed flow from the lower-density component thereof. The method may also include expelling at least a portion of the higher-density component of the mixed flow from the plurality of rotary separators via an outlet passage defined in each of the plurality of rotary separators, and draining the at least a portion of the higher-density component of the mixed flow through a drain in the casing. The method may further include receiving at least a portion of the lower-density component from the plurality of separators in an outlet manifold, and discharging the at least a portion of the lower-density component through a fluid outlet assembly of the pressurized casing.

DETAILED DESCRIPTION

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

FIG. 1 illustrates a cut-away, perspective view of an exemplary modular separator assembly 10, according to an embodiment described. The modular separator assembly 10 generally includes a pressurized casing 11, a plurality of rotary separators (four are shown: 12, 14, 16, 18) disposed therein, a fluid entrance assembly 13, and a fluid outlet assembly 15. It will be appreciated that fewer or additional rotary separators may be employed without departing from the scope of this disclosure. The pressurized casing 11 may be formed from an upstream end piece 11a, a base 11b, and a downstream end piece 11c that are fixed together, for example, by fastening, welding, or the like; however, any suitable construction of the pressurized casing 11 is within the scope of this disclosure.

The rotary separators 12, 14, 16, 18 may be disposed in parallel and positioned next to each other, for example, as shown. Accordingly, a mixed fluid flow is distributed among the parallel rotary separators 12, 14, 16, 18 for separation, rather than sequentially being separated by each separator 12, 14, 16, 18. It will be appreciated that "in parallel" does not require a particular spatial orientation of any of the separators 12, 14, 16, 18 with respect to one another, but is used herein to refer to the fluid flow therethrough. In some embodiments, additional rotary separators may be provided that are in series with any of the separators 12, 14, 16, 18.

Each rotary separator 12, 14, 16, 18 includes an inlet 20a, 20b, 20c, 20d, respectively, and an outlet 22a, 22b (the outlets of the separators 16 and 18 are not viewable), respectively. In an embodiment, the separators 12, 14, 16, 18 may be positioned such that the inlets 20a-d and outlets 22a,b (and the two not shown) are disposed in approximately the same axial plane, for example, in a square configuration as illustrated, although any suitable configuration may be employed. Each of the inlets 20a-d and outlets 22a,b (and those not shown) may be generally circular in cross-section. An inlet manifold 24 may extend between and fluidly couple together the fluid entrance assembly 13 and the inlets 20a-d. The inlet manifold 24 may include a plurality of ducts or "flow guides" 26a, 26b, 26c, 26d. The flow guides 26a-d may be any structures configured to channel fluid therein, and may be configured for optimal efficiency of such channeling. In an exemplary embodiment, each of the flow guides 26a-d may extend from the fluid entrance assembly 13 and may couple with the inlet 20a-d of one of the rotary separators 12, 14, 16, 18. Similarly, an outlet manifold 17 may extend between and couple together the outlets 22a,b (and those not shown) and the fluid outlet assembly 15. In an exemplary embodiment, the outlet manifold 17 and the inlet manifold 24 may be mirror images; however, in other exemplary embodiments, the manifolds 17, 24 may have substantially different shapes.

Proximal the fluid entrance assembly 13 the inlet manifold 24 may include a flow divider 25, which may define the upstream terminus of each of the flow guides 26a-d. The flow divider 25 is a device configured to separate fluid flow into two or more generally uniform portions, which may be delivered to separate conduits for further handling. In the illustrated embodiment, the flow divider 25 may separate a flow having a circular cross-section in the fluid entrance assembly 13 into four separate flows, each flow continuing into one of the flow guides 26a-d, respectively. Accordingly, although only a single one is completely viewable, the flow divider 25 may define four wedge or "pie-slice" shaped sections 27, one for each of the flow guides 26a-d.

As noted above, however, in an exemplary embodiment, the inlets 20a-d to the plurality of rotary separators 12, 14, 16, 18 may be circular in shape. Accordingly, the flow guides 26a-d may each smoothly transition from pie-slice shaped at the flow divider 25 to circular at the inlets 20a-d, providing a gradual change in the flowpath geometry to avoid pressure losses. Flow turning in the flow guides 26a-d may be generally less than about 45 degrees at any one point therein, and turning radii thereof are optimized, as will be apparent to one with skill in the art. Furthermore, in an exemplary embodiment, the flow guides 26a-d may be manufactured from thin metal, composite materials, or the like, as the flow guides 26a-d may not be required to withstand high forces.

Each of the rotary separators 12, 14, 16, 18 may be disposed in the pressurized casing 11 and supported therein, for example, on either end by disk-shaped partitions 28, 30 that are secured in and to the pressurized casing 11 using any suitable process or device. The partitions 28, 30 may have circular holes defined therein, in which the rotary separators 12, 14, 16, 18 may be received, as shown. Each of the rotary separators 12, 14, 16, 18 may have a stationary housing 32a, 32b, 32c, 32d, respectively, which may be coupled to the partitions 28, 30 via any other suitable process or device. The partitions 28, 30 may be constructed of any suitably strong material such that the partitions 28, 30 are capable of supporting both the weight of the rotary separators 12, 14, 16, 18 and thrust generated by pressure drops therein. In an exemplary embodiment, the partitions 28, 30 are sealed with the pressurized casing 11 and the stationary housings 32a-d of the rotary separators 12, 14, 16, 18 to form a liquid collection area that is isolated from the main process flow path, as shown.

The modular separator assembly 10 also includes a drain 34. The drain 34 is coupled to or integral with the pressurized casing 11 and extends through the wall of the pressurized casing 11 to provide fluid communication from the inside of the pressurized casing 11 to a drain pipe, collection device or assembly, or the like (not shown). The drain 34 may be positioned at the bottom of the pressurized casing 11, such that any fluid or other material expelled from the rotary separators 12, 14, 16, 18 falls into the drain 34 by gravity. Furthermore, the drain 34 may be spaced apart from the lowest-position of the rotary separators 12, 14, 16, 18 to allow for a tolerable amount of backing-up or flooding of the drain 34 to occur without affecting the operation of the rotary separators 12, 14, 16, 18. Although not shown, in other exemplary embodiments, the drain 34 may be located at other positions on the pressurized casing 11, with fluid being directed thereto from the rotary separators 12, 14, 16, 18 by any suitable ducts, housings, assemblies, or the like. Additionally, the drain 34 may be attached to a gas break vessel (not shown) to allow the pressure within the pressurized casing 11 to be maintained at significantly above ambient levels, while still allowing a separated fluid to be evacuated through the drain 34.

Figure 2:
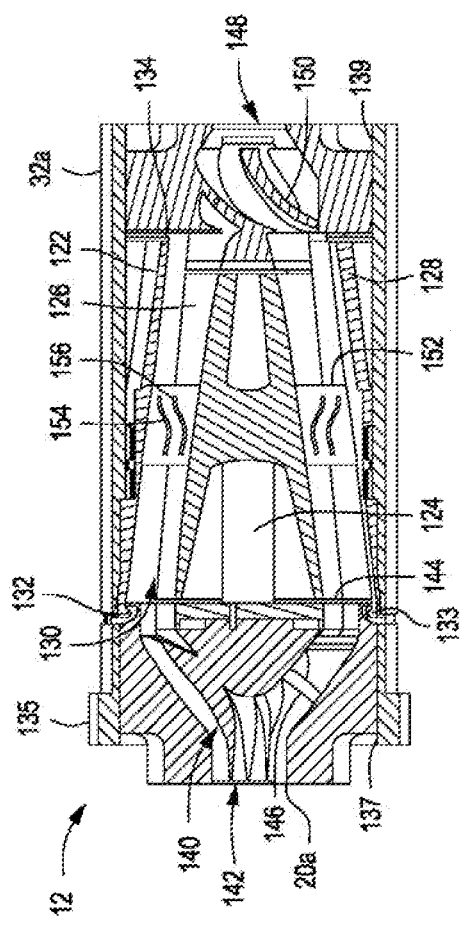
FIG. 2 illustrates a sectional view of an exemplary rotary separator of the plurality of rotary separators of FIG. 1, in accordance with one or more aspects of the disclosure.

With continuing reference to FIG. 1, FIG. 2 illustrates a sectional view of the rotary separator 12. It will be appreciated that each of the other rotary separators 14, 16, 18 illustrated in FIG. 1, as well as any additional rotary separators used in the modular separator assembly 10, may be generally the same as the illustrated rotary separator 12, may be similar thereto, or may be different therefrom, without departing from the scope of this disclosure. The rotary separator 12 includes the stationary housing 32a, as noted above with reference to FIG. 1. The stationary housing 32a may be substantially cylindrical, having a generally constant outer diameter, allowing for a minimized outer diameter for the rotary separator 12.

A rotatable drum 122 is disposed in the stationary housing 32a. The drum 122 may be, for example, supported on a shaft 124, which may be stationary, free-rotating, or driven by an external driver (not shown). Further, the drum 122 may have an inner drum wall 126 and an outer drum wall 128. In an exemplary embodiment, the inner and outer drum walls 126, 128 are concentrically disposed, or at least substantially so, and radially offset from one another to define an annular separation passage 130 therebetween. In other embodiments, the inner and outer walls 126, 128 may be eccentric. Further, the drum 122 may have an upstream end 132 and a downstream end 134. The separation passage 130 generally extends from the upstream end 132 to the downstream end 134; however, in some embodiments, the separation passage 130 may extend to or between different structures and/or passages.

In an exemplary embodiment, the diameter of the drum 122 decreases proceeding from the upstream end 132 to the downstream end 134. An outlet passage 133 may be defined in the rotary separator 12, with the outlet passage 133 fluidly communicating with the separation passage 130 and extending through the stationary housing 32a. In an exemplary embodiment, the outlet passage 133 is defined proximal, e.g., around, the upstream end 132 of the drum 122, as shown. In other exemplary embodiments, the drum 122 may be any suitable shape; for example, the drum 122 may have an area of increased radius proximal the axial middle thereof (not shown), or may increase in radius from the upstream end 132 to the downstream end 134 (not shown). Accordingly, the outlet passage 133 may be defined proximal, for example, around the outside of the area of increased radius, wherever it may be. In still other exemplary embodiments, the outlet passage 133 may be defined at other locations.

In an exemplary embodiment, a mounting flange 135 is coupled to the stationary housing 32a. The mounting flange 135 may be disposed at an upstream extent 137 of the stationary housing 32a; however, the mounting flange 135 may instead be disposed at a downstream extent 139 of the stationary housing 32a. In another exemplary embodiment, two mounting flanges may be provided, one at each extent 137, 139 (not shown). The mounting flange 135 may bear on the partition 28 (FIG. 1) to support the rotary separator 12 against thrust forces induced by a pressure drop between the inlet 20a and the drum 122.

The drum 122 may be supported by and coupled to the shaft 124 by any suitable device or process. For example, the drum 122 may be coupled to the shaft 124 via a bearing (not shown) coupled to the shaft 124 and the inner drum wall 126. The bearing may be a magnetic bearing; however, any type of bearing may be employed without departing from the scope of this disclosure.

The stationary housing 32a defines an inlet passage 140, which may be located upstream from the upstream end 132 of the drum 122. The inlet passage 140 may have a circular cross-section at an inlet end 142 and an annular cross-section at a drum end 144, with the inlet passage 140 fluidly communicating with the separation passage 130 proximal the drum end 144. In an exemplary embodiment, the inlet passage 140 provides a transition from a circular cross-section to an annular cross-section, with the radius of the inlet passage 140 increasing proceeding from the inlet end 142 to the drum end 144.

In some exemplary embodiments, a plurality of swirling structures 146 are disposed in the inlet passage 140, for example, proximal the drum end 144. The swirling structures 146 may be any structures that direct fluid in a circumferential direction. In the illustrated embodiment, the swirling structures 146 are stationary guide vanes. In various other embodiments, the swirling structures 146 may be rotating vanes or nozzles. Further, in some exemplary embodiments, the swirling structures 146 may be omitted, for example, if the rotary separator 12 is coupled to an external driver (not shown).

The stationary housing 32a further defines a discharge, which may be or include a diffuser passage 148 located downstream from the downstream end 134 of the drum 122. The diffuser passage 148 may have a plurality of de-swirling structures 150 disposed therein. The de-swirling structures 150 may be any structures that remove or attenuate a circumferential velocity component from a fluid flow. In the illustrated exemplary embodiment, the de-swirling structures 150 are stationary vanes; however, other structures such as rotating vanes, nozzles or the like may be employed. In various other embodiments, the de-swirling structures 150 may be omitted.

In an exemplary embodiment, the rotary separator 12 may include one or more radial separator blades 152 located in the separation passage 130, for example, proximal an axial middle of the drum 122. In an exemplary embodiment, the radial separator blades 152 may extend radially between the inner and outer drum walls 126, 128 and may be coupled thereto to provide structural support for the drum 122. In other exemplary embodiments, the radial separator blades 152 may extend partially between the inner and outer drum walls 126, 128 and be coupled to one or neither thereof; in the latter case, the radial separator blades 152 may be supported in the separation passage 130 by other structures (not shown). The radial separator blades 152 may also be curved, so as to turn fluid flowing between the radial separator blades 152.

In an exemplary embodiment, the rotary separator 12 may also include first and second circumferential separator blades 154, 156 located in the separation passage 130, proximal an axial middle of the drum 122. The circumferential separator blades 154, 156 may be spaced apart from the inner and outer drum walls 126, 128 and may extend around the inner drum wall 126. In an exemplary embodiment, the circumferential separator blades 154, 156 may be disposed at the same axial location as the radial separator blades 152 and may extend therethrough. The circumferential separator blades 154, 156 may be curved, as shown, so as to turn fluid flowing past the circumferential separator blades 154, 156.

In various exemplary embodiments, the radial separator blades 152 and the circumferential separator blades 154, 156 may be shaped, disposed, and configured in the same or similar way as described in commonly-assigned PCT Patent Application having Serial No. PCT/US2011/042205, the entirety of which is incorporated herein by reference to the extent consistent with this disclosure. In an exemplary embodiment, the radial separator blades 152 may be substituted with struts (not shown) and the circumferential separator blades 154, 156 may be substituted with a radial vane pack as described in commonly-assigned PCT Patent Application having Serial No. PCT/US2011/042209, the entirety of which is incorporated by reference herein to the extent consistent with this disclosure. In yet another exemplary embodiment, the rotary separator 12 may not include any blades or vanes in the separation passage 130 and/or may include any other structures therein without departing from the scope of this disclosure.

Figure 4:
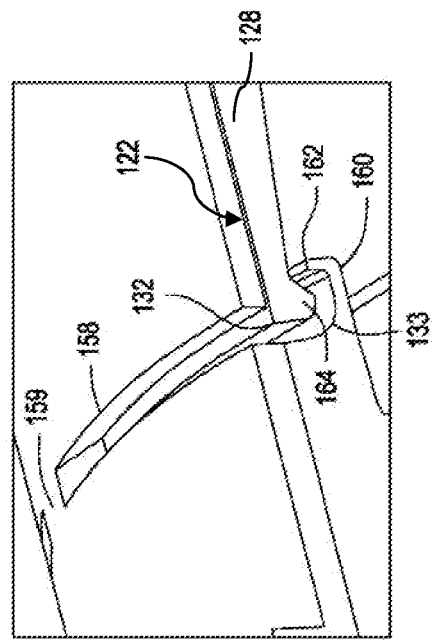
FIG. 4 illustrates an enlarged view of an exemplary outlet passage of the rotary separator of FIG. 2, in accordance with one or more aspects of the disclosure.
Figure 3:
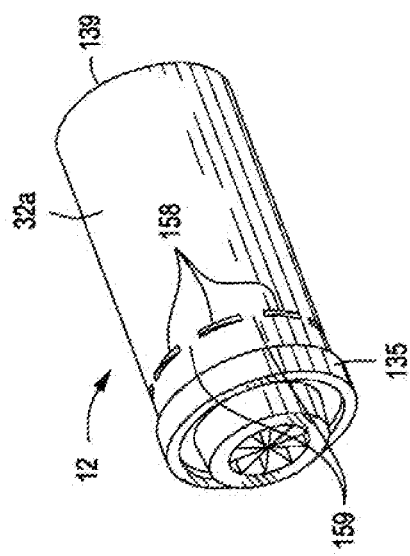
FIG. 3 illustrates a perspective view of the rotary separator of FIG. 2, in accordance with one or more aspects of the disclosure.

FIG. 3 illustrates a perspective view of the rotary separator 12, and FIG. 4 illustrates an enlarged view of the outlet passage 133 thereof, according to an embodiment. With reference to both FIGS. 3 and 4, the stationary housing 32a of the rotary separator 12 includes a plurality of slots 158, which may provide at least a portion of the outlet passage 133. The slots 158 may be defined in the stationary housing 32a at circumferential intervals, as shown. In various exemplary embodiments, the slots 158 may be rectangular, round, or any other suitable shape. The slots 158 may be located proximal and downstream from the mounting flange 135, as shown, at the axial middle of the rotary separator 12, and/or closer to the downstream extent 139 thereof.

The slots 158 are separated by tenons 159. The tenons 159 may have an angle with respect to the tangency of the stationary housing 32a radius of between about 10 degrees and about 30 degrees. The angle of the tenons 159 may provide for slots 158 that expand circumferentially proceeding radially-outward. In other embodiments, the angle of the tenons 159 may provide for slots 158 that expand circumferentially proceeding radially-inward. Further, the circumferential extent of the tenons 159 may be limited to about five degrees of arc or less.

As shown in FIG. 4, the stationary housing 32a (FIG. 3) further includes a ledge 160 which extends from upstream of the upstream end 132 of the drum 122 (FIG. 2) and therepast. In an exemplary embodiment, the ledge 160 terminates with a radially-outward extending lip 162. The outer drum wall 128 of the drum 122 may include a corresponding, radially-inward extending lip 164 at the upstream end 132. The lip 164 of the outer drum wall 128 may be disposed around and spaced apart from the ledge 160 of the stationary housing 32a. Accordingly, the ledge 160 and the lips 162, 164 may define the outlet passage 133, as shown.

Figure 5:
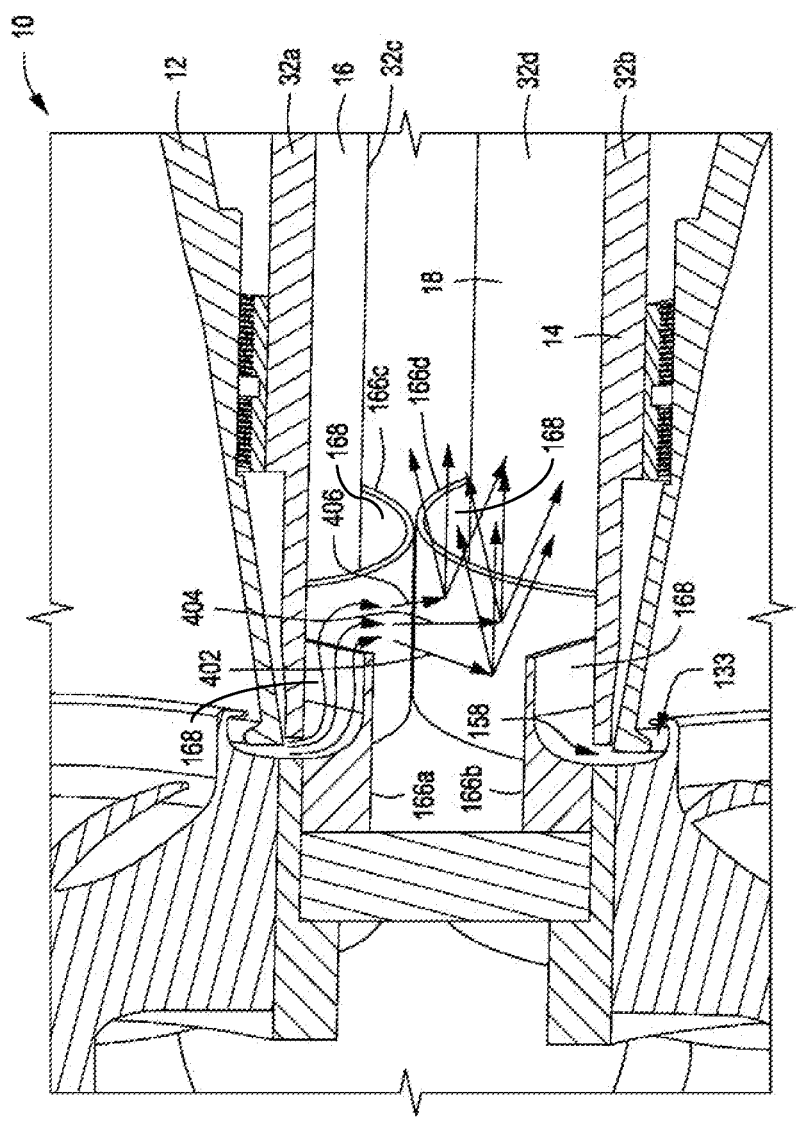
FIG. 5 illustrates an enlarged, partial, sectional view of the modular separator assembly of FIG. 1, in accordance with one or more aspects of the disclosure.

With additional reference to FIG. 1, FIG. 5 illustrates an enlarged, partial, sectional view of the modular separator assembly 10. As illustrated, each rotary separator 12, 14, 16, 18 may include one or more fluid shields 166a, 166b, 166c, 166d, respectively. The fluid shields 166a-d may each be disposed partially or entirely around the stationary housings 32a-d of the rotary separators 12, 14, 16, 18, respectively, and may cover the slots 158 thereof. The fluid shields 166a-d may each include a curved surface 168 on the radial inside thereof, which may align with the slots 158 as shown. Accordingly, the fluid shields 166a-d may each receive a separated fluid from the outlet passage 133 and turn the fluid from generally straight radial to axial, thereby absorbing some of the energy of any separated fluid spraying of out of the outlet passage 133. Further, the fluid shields 166a-d may protect the rotary separators 12, 14, 16, 18 from re-entrainment of fluid separated by other rotary separators 12, 14, 16, 18 by blocking any direct paths between slots 158 of the rotary separators 12, 14, 16, 18.

Figure 6:
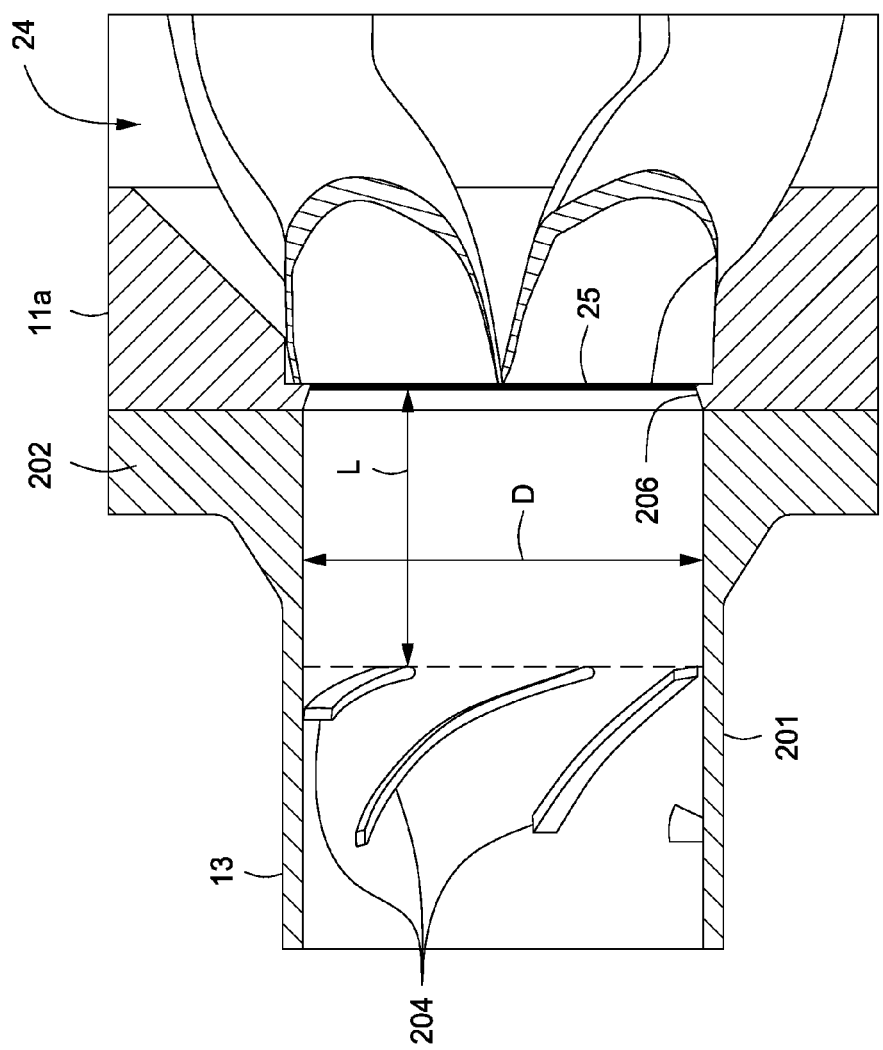
FIG. 6 illustrates a cut-away, side, perspective view of the fluid entrance assembly of FIG. 1, in accordance with one or more aspects of the disclosure.
Figure 7:
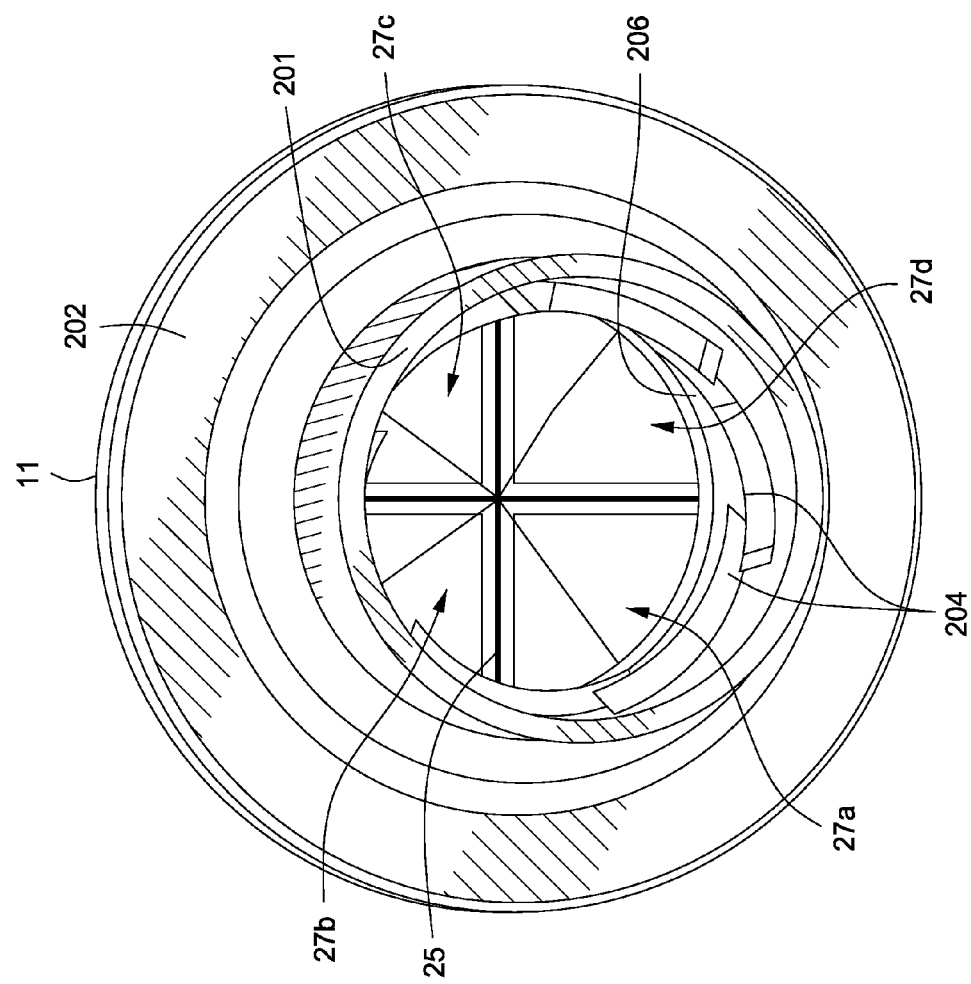
FIG. 7 illustrates a raised, end, perspective view of the fluid entrance assembly of FIG. 1, in accordance with one or more aspects of the disclosure.

FIG. 6 illustrates a cut-away, side, perspective view of an exemplary fluid entrance assembly 13, which, as shown and described above with reference to FIG. 1, may be disposed at and extend from the upstream end piece 11a of the pressurized casing 11. FIG. 7 illustrates a raised, end perspective view of the exemplary fluid entrance assembly 13. As shown, the fluid entrance assembly 13 may include a pipe 201 that is coupled to the inlet manifold 24. The pipe 201 may be cylindrical such that it defines a diameter D; however, in other embodiments, the pipe 201 may have any shape. The pipe 201 may be coupled to the upstream end piece 11a of the pressurized casing 11 via a flange 202, as shown. In other embodiments, the pipe 201 may be coupled to the upstream end piece 11a, or any other part of the pressurized casing 11, using any suitable device or method.

The fluid entrance assembly 13 may further include one or more distributor vanes 204 disposed in and extending inward from the pipe 201. In an exemplary embodiment, the distributor vanes 204 may extend inward from the pipe 201 to a distance of from about 5% to about 10% of the diameter D. Furthermore, the distributor vanes 204 may be oriented at an angle to induce swirling of fluid flowing at the radial extents of the pipe 201. In an exemplary embodiment, the distributor vanes 204 are oriented to produce an exit angle of from about 40 degrees to about 70 degrees from straight axial. Further, the distributor vanes 204 may be spaced axially apart from the flow divider 25 by a distance L to allow swirling of the fluid to develop prior to encountering the flow divider 25, but not too far such that swirling to abates prior to encountering the flow divider 25. In an exemplary embodiment, the distance L is between about 1.0 and about 2.0 times the diameter D upstream from the flow divider 25.

The fluid entrance assembly 13 may also include a ramp 206, which may be positioned between the distributor vanes 204 and the flow divider 25. As shown, the ramp 206 may be integrally-formed with the upstream end piece 11a of the pressurized casing 11. In other embodiments, however, the ramp 206 may instead be a separate component that is attached to the upstream end piece 11a or disposed in and attached to the pipe 201. In an exemplary embodiment, the ramp 206 has about a 30 degree slope and extends inward to a maximum height of about 5% of the diameter D.

FIG. 7 also illustrates an end view of the flow divider 25, described above with reference to FIG. 1. As shown, the flow divider 25 divides the flow in the pipe 201 into four wedge or pie-slice shaped sections 27a-d. As will be appreciated with additional reference to FIG. 1, the flow guides 26a-d are each fluidly coupled to one of the sections 27a-d, with the flow guides 26a-d configured to receive flow from one of the sections 27a-d and provide it to the separators 12, 14, 16, 18, respectively.

Referring now to FIGS. 1 and 6, in exemplary operation, a mixed flow is introduced to the fluid entrance assembly 13. The mixed flow may have a lower-density component, for example, gas, and a higher-density component, for example, liquid. It will be appreciated, however, that the mixed flow may be single phase (e.g., two or more liquids having different densities or two or more gases having different densities) and/or may include solids such as particulate matter.

The higher-density component may tend to concentrate and flow along the bottom of the pipe 201 in the fluid entrance assembly 13. To avoid such concentration and provide a more homogeneous mixed flow, thereby avoiding greater or reduced separation loading on any one of the rotary separators 12, 14, 16, 18 with respect to the others, the mixed flow may be "distributed" in the fluid entrance assembly 13. Accordingly, the mixed flow may encounter the distributor vanes 204, which may tend to cause the mixed flow proximal the radial extents thereof to change direction, adding a circumferential velocity component thereto. This may force any concentration of the higher-density component at the lower portion of the pipe 201 to swirl around the pipe 201, leading to a more uniform distribution of the higher and lower-density components of the fluid. The mixed flow may then encounter the ramp 206, which may further distribute any of the higher-density component concentrated at the radial extents of the mixed flow by directing it radially-inward. The mixed flow may then be divided in the fluid divider 25 and proceed into the flow guides 26a-d of the inlet manifold 24.

The mixed flow may then proceed through the inlet manifold 24 via the flow guides 26a-d. The flow guides 26a-d may minimize pressure loss by maintaining relatively constant flow passage cross-sectional area, smoothly transitioning from the pie-slice shaped sections 27a-d (FIG. 7) to the circular inlets 20a-d, and avoiding any high-degree turning. The mixed flow may then enter the rotary separators 12, 14, 16, 18 via the inlets 20a-d for separation.

Referring now to FIG. 2, in an exemplary embodiment, the mixed flow is swirled, i.e., turned to a circumferential direction, in the inlet passage 140 using the swirling structures 146. The swirled, mixed flow then proceeds to the separation passage 130 and engages the inner and/or outer drum walls 126, 128. This engagement produces a circumferentially-oriented drag force on the drum 122, causing the drum 122 to rotate. The rotation of the drum 122 applies an inertial force on the mixed flow, causing the higher-density component thereof to separate from the lower-density component, and urging the higher-density component toward the outer drum wall 128 with more force than is applied to the lower-density component. The higher-density component may then collect and/or otherwise coalesce on the outer drum wall 128.

In the illustrated exemplary embodiment, the drum 122 has a decreasing radius, as described above. Accordingly, the inertial force on the higher-density component drives it to move radially-outward. As such, the higher-density component flows along the outer drum wall 128 toward the upstream end 132. Referring now to FIG. 4, when the separated higher-density component reaches the upstream end 132, it enters the outlet passage 133. The lips 162, 164 and the ledge 160 ensure that a maximum amount of the separated higher-density component is transported from the separation passage 130 (FIG. 2) to the outlet passage 133; however, it will be appreciated that some of the lower-density component may also be expelled from the separation passage 130 along with the higher-density component. The remaining lower-density component in the separation passage 130, and any small amounts of unseparated higher-density component, may then proceed to the diffuser passage 148. Therein, the fluid may be de-swirled by the de-swirling structures 150 and may then proceed out of the rotary separator 12.

Figure 8:
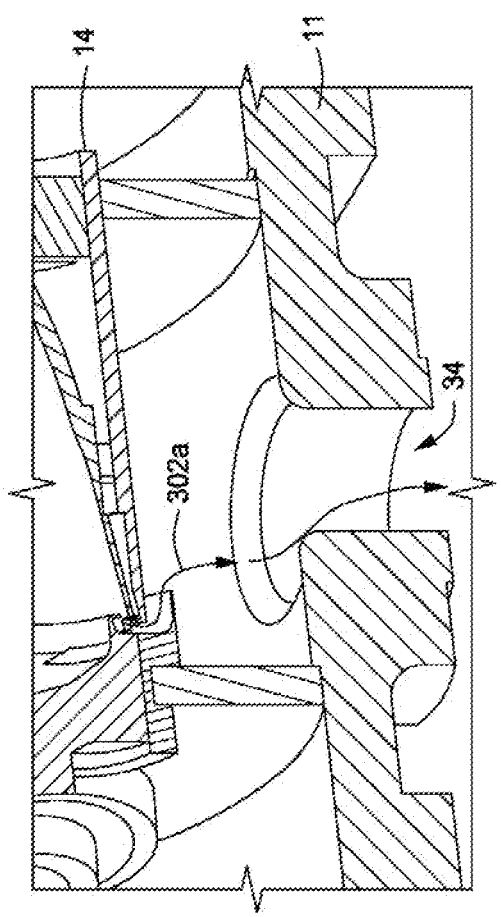
FIG. 8 illustrates a sectional view of an exemplary drain of the modular separator assembly of FIG. 1, in accordance with one or more aspects of the disclosure.
Figure 9:
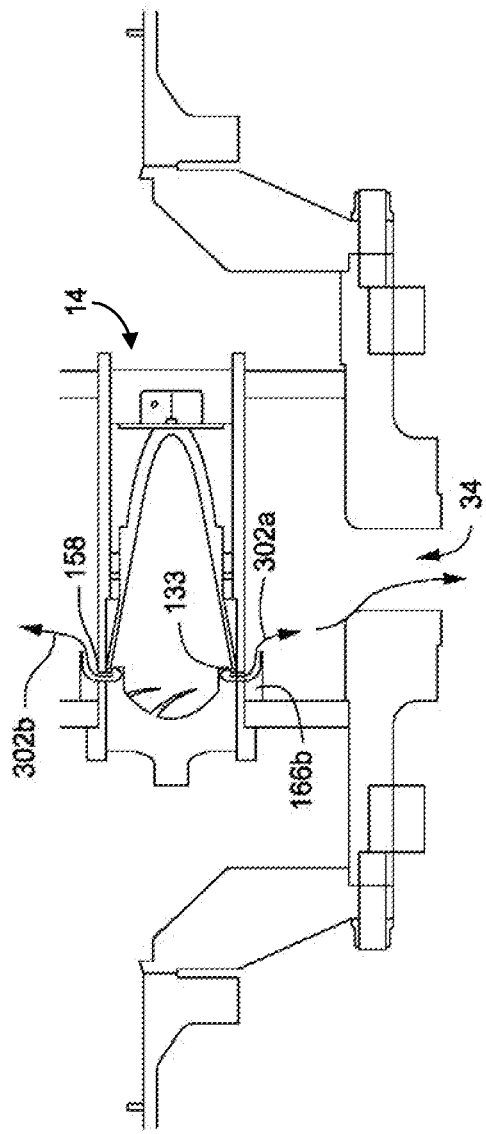
FIG. 9 illustrates a schematic view of another exemplary rotary separator and the drain of FIG. 8, in accordance with one or more aspects of the disclosure.

Turning back to the separated higher-density component, along with a relatively small amount of the lower-density component, it may be expelled from each of the rotary separators 12, 14, 16, 18 (FIG. 1) and proceed to the drain 34 (FIG. 1). FIG. 8 illustrates a sectional view of an exemplary drain 34, and FIG. 9 illustrates a schematic view of the rotary separator 14 and the drain 34. Together, FIGS. 8 and 9 illustrate the expulsion of the fluid from one of the lower-positioned rotary separators 14. It will be appreciated that the other rotary separators 12, 16, and 18 may perform in substantially the same manner as shown in FIG. 8 with reference to rotary separator 14. As illustrated by arrows 302a and 302b, the fluid expelled from the rotary separator 14 may proceed radially-outward in all directions away from the rotary separator 14 via the outlet passage 133 (FIG. 5), and may be turned by the fluid shield 166b (FIG. 5) after exiting the outlet passage 133 via the slots 158. Although initially the expelled higher-density component may be projected upwards, as shown by arrow 302b, or to the sides (into and out of the page as viewed from the perspective of FIG. 5), the higher-density component is eventually accelerated downwards by gravity to the drain 34 for collection and evacuation from the pressurized casing 11.

Referring now to FIG. 5, expulsion of the higher-density component from the rotary separators 12 is illustrated by arrows 402, 404, and 406. The higher-density component in the rotary separators 12, 16 may be expelled radially-outward in all directions, in a similar fashion as described above for the lower-positioned rotary separator 14. The higher-density component expelled from the bottom of the upper rotary separators 12, 16 travels downward by gravity toward the drain 34 (FIGS. 8 and 9). The fluid shields 166b, 166d of the lower-positioned rotary separators 14, 18 deflect the higher-density component exiting the upper rotary separators 12, 16, thereby avoiding re-entrainment of the separated higher-density component in lower-positioned rotary separators 14, 18, as illustrated by arrows 402, 404, 406. Further, fluid deflectors 166a,c substantially prevent re-entrainment of higher-density component expelled upward, as illustrated by arrow 302b in FIG. 9, from the lower-positioned rotary separators 14, 18 into the upper rotary separators 12, 16.

Referring back to FIG. 1, the separated flow, predominately made up of the remaining lower-density component of the mixed flow, with small amounts of the higher-density component, if any, remaining in the rotary separators 12, 14, 16, 18, may progress into the outlet manifold 17. The separated flow proceeds from the rotary separators 12, 14, 16, 18 may then recombine in the fluid outlet assembly 15 (e.g., in the outlet manifold 17) and may proceed out of the modular separator assembly 10 to any pipes, turbomachines, scrubbers or other devices positioned downstream therefrom.

Figure 10:
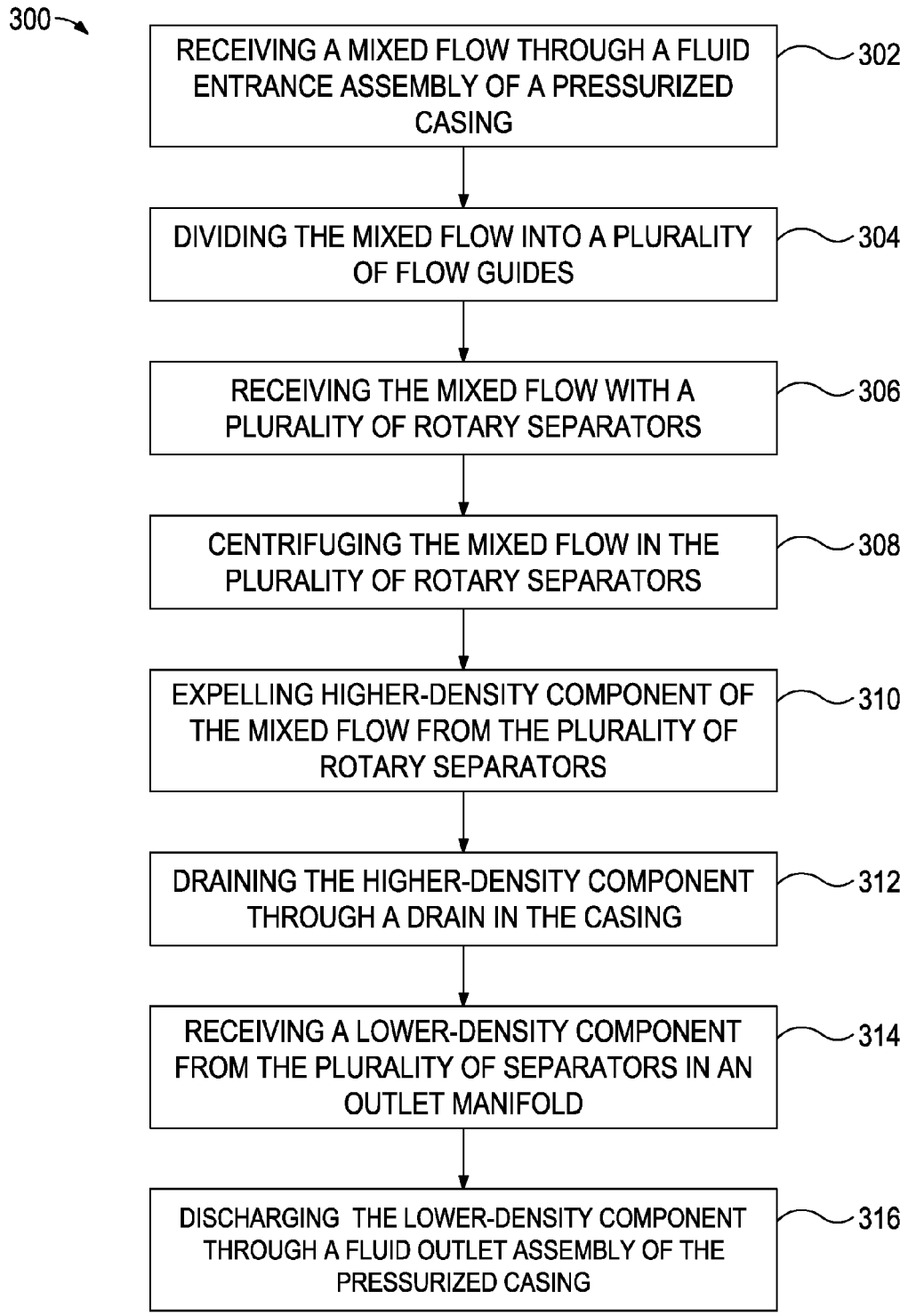
FIG. 10 illustrates a flowchart of a method for separating a higher density component of a mixed flow from a lower density component of the mixed flow, in accordance with one or more aspects of the disclosure.

FIG. 10 illustrates a flowchart of a method 300 for separating a higher-density component of a mixed flow from a lower-density component of the mixed flow. In at least one embodiment, the method 300 may proceed by operation of the modular separator assembly 10 described above with reference to FIGS. 1-9 and may thus be best understood with reference thereto. The method 300 may include receiving the mixed flow through a fluid entrance assembly of a pressurized casing, as at 302. The method 300 may then proceed to dividing the mixed flow and introducing the divided mixed flow to a plurality of flow guides, as at 304. In at least one embodiment, the method 300 may also include distributing the mixed flow in the fluid entrance assembly with a ramp and/or distributor vanes disposed upstream of the plurality of flow guides. The method 300 may also include receiving the mixed flow from the plurality of flow guides with a plurality of rotary separators disposed in parallel in the pressurized casing, as at 306. The method 300 may also include centrifuging the mixed flow in the plurality of rotary separators to separate the higher-density component of the mixed flow from the lower-density component thereof, as at 308. The method 300 may further include expelling at least a portion of the higher-density component of the mixed flow from the plurality of rotary separators via an outlet passage defined in each of the plurality of rotary separators, as at 310.

After the at least a portion of the higher-density component has been separated and expelled, the method 300 may proceed to draining the at least a portion of the higher-density component of the mixed flow through a drain in the casing, as at 312. Additionally, the method 300 may include receiving at least a portion of the lower-density component from the plurality of separators in an outlet manifold, as at 314. The method 300 may also include discharging the at least a portion of the lower-density component through a fluid outlet assembly of the pressurized casing, as at 316. In at least one embodiment, the method 300 may also include shielding the outlet passage of at least one of the plurality of rotary separators with at least one fluid shield; and turning the at least a portion of the higher-density component discharged via the outlet passage of the at least one of the plurality of rotary separators from radially-outward to substantially axial with the at least one fluid shield.

Although certain aspects of the method 300 are described herein as proceeding sequentially, one with skill in the art will appreciate that the method 300 may proceed in any suitable sequence.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

We claim:

1. An apparatus for separating a mixed flow into a higher-density component and a lower-density component, comprising:
a casing having a fluid entrance assembly, a fluid outlet assembly, and a drain; and
a plurality of rotary separators disposed in the casing, wherein
each rotary separator of the plurality of rotary separators has an inlet in fluid communication with the fluid entrance assembly, a discharge in fluid communication with the fluid outlet assembly, and an outlet passage in communication with the drain, and
at least one rotary separator of the plurality of separators includes
a stationary housing that defines a slot that at least partially provides the outlet passage; and
a rotatable drum disposed at least partially in the stationary housing, the rotatable drum being configured to centrifuge the mixed flow.

2. The apparatus of claim 1, wherein at least two rotary separators of the plurality of rotary separators are disposed in parallel in the casing.

3. The apparatus of claim 1, wherein the at least one rotary separator of the plurality of rotary separators further includes a fluid shield aligned with the slot and configured to prevent fluid from entering the stationary housing via the outlet passage.

4. The apparatus of claim 3, wherein the fluid shield is curved to turn the higher-density component expelled through the outlet passage from a radially-outward direction to a substantially axial direction.

5. The apparatus of claim 1, wherein the fluid entrance assembly includes:
a flow divider defining sections and configured to divide the mixed flow in the fluid entrance assembly; and
an inlet manifold including a plurality of flow guides fluidly coupled to the flow divider and extending therefrom to the plurality of rotary separators, each flow guide of the plurality of flow guides being configured to introduce a flow from one of the sections to at least one rotary separator of the plurality of rotary separators.

6. The apparatus of claim 5, wherein the flow divider includes a plurality of vanes, with the number of the plurality of vanes included being equal to the number of the plurality of rotary separators included in the casing.

7. The apparatus of claim 5, wherein the fluid outlet assembly includes an outlet manifold coupled to the discharge of each rotary separator of the plurality of rotary separators, wherein the outlet manifold is a mirror image of the inlet manifold.

8. The apparatus of claim 5, wherein the fluid entrance assembly includes:
a pipe;
a ramp disposed between the pipe and the flow divider; and
one or more distribution vanes disposed in the pipe.

9. The apparatus of claim 8, wherein the ramp has a slope of about 30 degrees.

10. The apparatus of claim 8, wherein each distribution vane of the one or more distribution vanes has a height that is between about 5% and about 10% of a diameter of the pipe.

11. The apparatus of claim 8, wherein the one or more distribution vanes are spaced apart from the flow divider by a distance of between about 1.0 to about 2.0 times a diameter of the pipe.

12. The apparatus of claim 8, wherein the one or more distribution vanes are oriented to produce an exit angle of between about 40 degrees and about 70 degrees with respect to straight axial in the pipe.

13. A modular fluid separator assembly, comprising:
a pressurized casing having a fluid outlet assembly, a drain, and a fluid entrance assembly including a flow divider defining sections, distribution vanes disposed upstream the flow divider, and a ramp disposed upstream the flow divider, the distribution vanes and the ramp being configured to distribute a mixed fluid flow;

a plurality of flow guides fluidly coupled to the flow divider, each flow guide of the plurality of flow guides being configured to receive the mixed fluid flow from one of the sections of the flow divider;

a plurality of rotary separators disposed in parallel in the pressurized casing, each rotary separator of the plurality of rotary separators having a discharge and an inlet fluidly coupled to one of the plurality of flow guides, and defining an outlet passage in fluid communication with the drain, wherein each rotary separator of the plurality of rotary separators is configured to separate the mixed fluid flow and to expel a higher-density component thereof to the drain; and an outlet manifold extending from and fluidly coupling the discharge of each rotary separator of the plurality of rotary separators to the fluid outlet assembly, wherein each rotary separator of the plurality of rotary separators includes a stationary housing defining circumferentially-extending slots therein, the circumferentially-extending slots at least partially providing the outlet passage; and a rotatable drum disposed in the stationary housing, the rotatable drum configured to rotate to at least partially separate the higher-density component of the mixed fluid flow from a lower-density component thereof.

14. The modular fluid separator assembly of claim 13, wherein each rotary separator of the plurality of rotary separators includes an upstream end and a downstream end, the upstream ends of each rotary separator of the plurality of rotary separators being disposed substantially in a common axial plane, and the downstream ends of each rotary separator of the plurality of rotary separators being disposed substantially in a common axial plane.

15. The modular fluid separator assembly of claim 13, wherein each rotary separator of the plurality of rotary separators further includes one or more fluid shields extending radially from an outside of the stationary housing and configured to shield the circumferentially-extending slots.

16. The modular fluid separator assembly of claim 13, wherein the circumferentially-extending slots are separated by tenons defined by the stationary housing, the tenons having an arc length of less than about 5 degrees and disposed at an angle of between about 10 degrees and about 30 degrees with respect to a tangency of the stationary housing.

17. A method for separating a higher density component of a mixed flow from a lower density component of the mixed flow, comprising:

receiving the mixed flow through a fluid entrance assembly of a pressurized casing;

dividing the mixed flow;

introducing the divided mixed flow to a plurality of flow guides;

distributing the mixed flow in the fluid entrance assembly with a ramp disposed upstream of the plurality of flow guides;

receiving the mixed flow from the plurality of flow guides with a plurality of rotary separators disposed in parallel in the pressurized casing;

centrifuging the mixed flow in the plurality of rotary separators to at least partially separate the higher-density component of the mixed flow from the lower-density component thereof;

expelling at least a portion of the higher-density component of the mixed flow from the plurality of rotary separators via an outlet passage defined in each rotary separator of the plurality of rotary separators;

draining the at least a portion of the higher-density component of the mixed flow through a drain in the pressurized casing;

receiving at least a portion of the lower-density component from the plurality of rotary separators in an outlet manifold; and discharging the at least a portion of the lower-density component through a fluid outlet assembly of the pressurized casing.

18. The method of claim 17, further comprising distributing the mixed flow in the fluid entrance assembly with one or more distribution vanes disposed upstream of the plurality of flow guides.

19. The method of claim 17, further comprising:

shielding the outlet passage of at least one rotary separator of the plurality of rotary separators with at least one fluid shield; and turning the at least a portion of the higher-density component expelled via the outlet passage of the at least one rotary separator of the plurality of rotary separators from a radially-outward direction to a substantially axial direction with the at least one fluid shield.

* * * * *